United States Patent [19]

Narita et al.

[11] 4,152,218
[45] May 1, 1979

[54] METHOD FOR THE DISTILLATION OF SEA WATER

[75] Inventors: Tsuneo Narita; Shigeo Yoshihara; Yoshihiro Ikenaga, all of Kure, Japan; Tokuji Iijima, deceased, late of Hitachi, Japan, by Yoshie Iijima, administratrix

[73] Assignee: Hitachi, Ltd., Tokyo, Japan

[21] Appl. No.: 740,405

[22] Filed: Nov. 10, 1976

Related U.S. Application Data

[60] Continuation of Ser. No. 509,120, Sep. 25, 1974, abandoned, which is a division of Ser. No. 391,682, Aug. 27, 1973, abandoned.

[30] Foreign Application Priority Data

Aug. 28, 1972 [JP] Japan .................................. 47-85310

[51] Int. Cl.² .............................................. B01D 1/26
[52] U.S. Cl. ............................ 203/10; 203/DIG. 17; 210/63 R; 210/71

[58] Field of Search .............. 203/10, 11, 7, DIG. 17; 202/236, 234, 173, 174, 176, 177; 159/4 A, DIG. 8, 2 MS; 210/56, 63 R, 57, 50, 71, 48

[56] References Cited

U.S. PATENT DOCUMENTS

| 2,921,004 | 1/1960 | Wood ...................................... 202/176 |
| 3,026,261 | 3/1962 | Mayfield et al. ........................ 210/56 |
| 3,649,469 | 3/1972 | MacBeth ................................. 203/10 |

Primary Examiner—Frank Sever
Attorney, Agent, or Firm—Thomas E. Beall, Jr.

[57] ABSTRACT

Apparatus for the distillation of sea water and desulfurization has a vessel directly contacting waste gases exhausting from a boiler with sea water for absorbing sulfur oxides contained within the waste gases, an oxidation device to convert the sulfites that are produced by absorption of the sulfur oxide into sulfates through a catalytic action of metallic ions in the sea water, a decarbonization device, a deaerator, and a heating type distillation apparatus that uses the sea water used for the desulfurization as supplementary water. The oxidation, desulfurization and the separation of air are processes conducted continuously.

9 Claims, 1 Drawing Figure

U.S. Patent  May 1, 1979  4,152,218
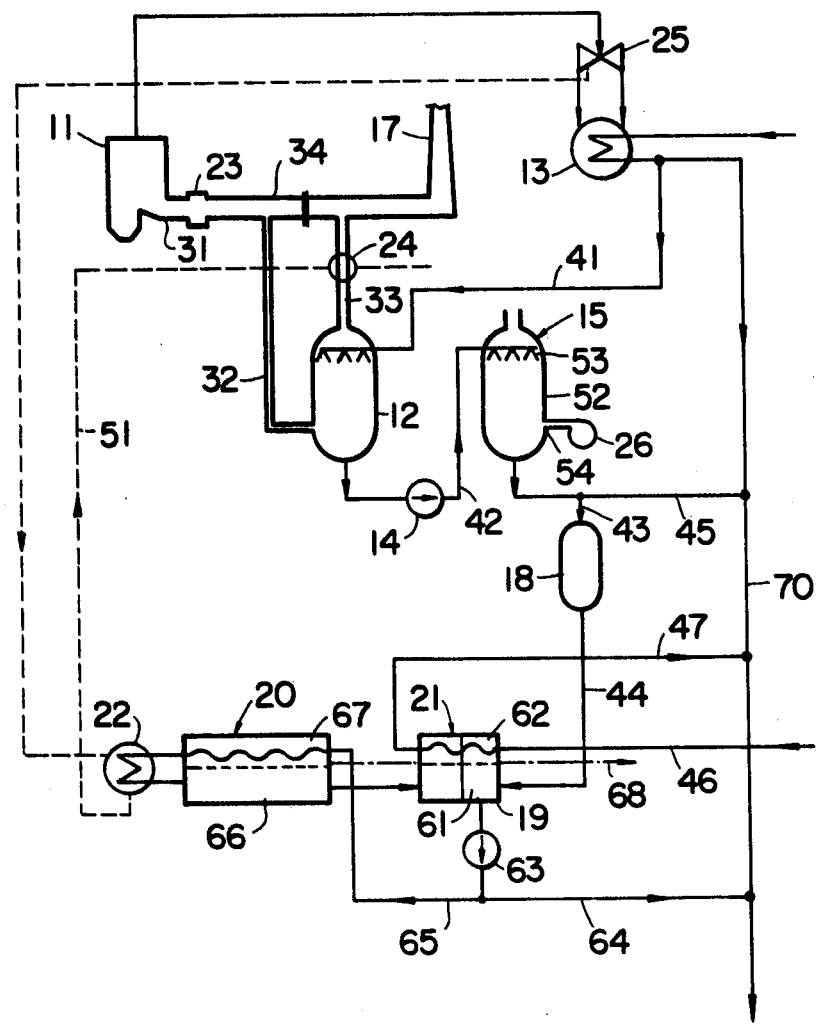

METHOD FOR THE DISTILLATION OF SEA WATER

This is a continuation, of application Ser. No. 509,120, now abandoned filed Sept. 25, 1974, which is a division of Ser. No. 391,682 filed Aug. 27, 1973 now abandoned.

BACKGROUND OF THE INVENTION

Sulfur oxides contained in the waste gases from boilers and other industrial furnaces and the like are the sources of air pollution and even a small amount of them present in the atmosphere will be hazardous to the human body. It is, therefore, necessary to prevent such sulfur oxides from being dispersed into the atmosphere. For this purpose, there must be provided an apparatus which is not only capable of removing such sulfur oxides from industrial waste gases, but one that is also practical and economical for industrial applications.

On the other hand, to meet the scarcity of industrial and domestic fresh water, apparatus for the distillation of sea water have recently been used, particularly employing multistage flash evaporators. The type of sea water distillation employing heat, such as the multistage flash evaporator, requires the pretreatment of the sea water to prevent the production of scales in the distillation apparatus. The most useful pretreatment of the sea water for this purpose relates to PH control, in which the PH of the sea water is controlled by injecting acids into the sea water.

There is known a multistage flash evaporator suitable for large capacity and low cost production. The apparatus uses the principal whereby the pressure of heated sea water is reduced at saturation pressure, so that the sea water starts to boil and instantaneously evaporate. With respect to structure, materials, the prevention of scale formation and the entire system, there has been considerable research and development that is quite advanced. Supplementary sea water or makeup sea water to the multistage flash evaporator usually requires the pretreatment of the sea water for preventing the deposition of scales on a surface of tubes of the heat exchanger and corrosion of the structural materials. In such pretreatments for the prevention of scale deposition by PH control, the addition of chemicals has been regarded as a practical and useful means for the prevention of soft scale formation. The injection of acids however has brought about the rising cost of distillation.

In order to remove sulfur oxides from waste gas, there has been proposed a dry method employing powdered or granular absorbents, reagents and catalizers, and a wet method using alkaline solutions or calcium hydroxide. The dry method has been found to be quite costly and employs large size apparatus for the regeneration of the active carbons or manganese. The active carbon method still remains a problem with respect to the life of the active carbons and the manganese method contains a defect such that a secondary pollution is caused by the scattering of the powdered manganese. The wet method brings about a remarkable temperature fall and consumes a lot of chemical materials as neutralizers. These prior desulfurizing methods have produced extensive by-products and have required various apparatus in order to effectively utilize the by-products and to convert them into harmless material that may be disposed of.

SUMMARY OF THE INVENTION

The present invention relates to the combination of apparatus for the distillation of sea water and a device for the removal of sulfur oxides from waste industrial gases such that the two complement each other.

The present invention employs a new desulfurizing method including the process that utilizes sea water that exists in great quantities for the removal of sulfur oxides, such as sulfur anhydride gases without the utilization of chemical materials and provides an apparatus for the distillation of sea water that does not use the prior PH control methods and utilizes the sea water that had been used for the removal of sulfur oxides.

By distilling the sea water that had been used for the removal of sulfur oxides, the apparatus is compact in form in addition to reducing the cost, and does not require the special chemical pretreatments heretofor employed for supplemental sea water and distillation, because the sea water is pretreated during the removal of sulfur oxides from exhaust gases. Thus, the prevention of scale formation has been satisfactory even in multistage flash evaporators by utilizing the by-products of an apparatus for the removal of sulfur oxides from waste gases.

The apparatus of the present invention is used with a source producing waste gases containing sulfur oxides and includes means to directly contact such waste gases with sea water in order to absorb the sulfur oxides contained in the waste gases exhausting from the source, a flue to supply the waste gases to said means, a conduit to supply the sea water thereto, a flue to release the treated waste gases from said means, a device for the oxidation of sulfites which are produced by the absorption of sulfur oxides to thereby produce stable sulfates through a catalytic action of the metallic ions in the sea water, a device for the decarbonization to hydrogen ions produced by the absorption and carbonic acid ions in the sea water to discharge carbonic acid gases therefrom, a deaerator connected with the device for decarbonization to separate air from the sea water after said oxidation and said decarbonization, and an apparatus of the heated type for distilling the sea water as supplementary water to produce fresh water.

BRIEF DESCRIPTION OF THE DRAWING

Further objects, features and advantages of the present invention will become more clear from the following detailed description of the drawing, wherein:

The single FIGURE if a schematic representation of the apparatus of the present invention.

DETAILED DESCRIPTION OF THE DRAWING

Sea water which shows an alkaline PH from 8.2 to 8.3 can efficiently absorb sulfuric anhydride gases. The principal dissolved ions which control the alkalinity of sea water are $HCO_3-$, $CO_3--$, $HBO_3-$, $OH-$ and $H+$. The value of the PH where the $H+$ ion is not present among these ions is called "all alkalinity". While the quantity of sulfuric anhydride gases absorbed in the sea water does not exceed the equivalence of all alkalinity, the PH of the sea water can be kept in the alkaline range. Namely, the operation of the decarbonization in which $HCO_3-$ in the sea water reacts with $H+$ produced by the absorption of the sulfuric anhydride gases causes the sea water to return to the original condition. The sulfuric anhydride ions ($SO_3--$) dissolved in the sea water react with the metallic ions ($Ca++$, $Mg++$ etc.)

in the sea water to become sulfites. There are other metallic ions such as Fe+, Mn+, Ni+, Cu+ etc. in the sea water and these ions provide a catalytic action for the oxidation of the sulfites. The sulfites are respectively easily oxidized by aeration to become stable sulfates, which sulfates are harmless and can be discharged without any further chemical treatment.

The chemical reaction formula for the above mentioned process is as follows:

$$SO_2 + H_2O \rightarrow H_2SO_3 \rightarrow 2H^+ + SO_3^{--} \ldots \quad (1)$$

$$H^+ + HCO_3^- \rightarrow H_2O + CO_2 \ldots \quad (2)$$

$$SO_3^{--} + CA^{++} \rightarrow CaSO_3 \ldots \quad (3)$$

$$CaSO_3 + \tfrac{1}{2}O_2 \rightarrow CaSO_4 \ldots \quad (4)$$

The prior apparatus for the distillation of sea water that employ a heat source use a PH control method as a pretreatment of the sea water to prevent the deposition of scale such as $CaCO_3$, $Mg(OH)_2$ on the surface of heat exchanger tubes. The deposition of $CaCO_3$ is prevented by eliminating $CO_2$ which is an element thereof and $Mg(OH)_2$ does not deposite in the region of acidity. Therefore, in the case where the sea water is introduced into the prior apparatus, the scale elements have been removed by injecting $H_2SO_2$ into the sea water. This pretreatment of the sea water used for the distillation in the prior apparatus is similar to the process of eliminating the sulfuric anhydride gases from the exhaust gases. Thus it becomes possible to utilize the sea water used for the process of the elimination of sulfuric anhydride gases as a supplementary water for the apparatus for distillation, so that pretreatments of the prior art become unnecessary.

The apparatus of the present invention will now be described with reference to the accompanying drawing, wherein there is shown a boiler 11, an absorber of sulfuric anhydride gases 12, a condenser 13, a water pump 14, a device for the oxidation and decarbonization 15, a chimney 17, a deaerator 18, a final flash chamber 19 of a multistage flash evaporator, a heat recovery section 20 of the multistage evaporator, a heat dissipation section 21 of the multistage evaporator, a brine heater 22, a dust collector 23, a heater 24 for the exhaust gas from the absorber 12, a steam turbine 25, and a blower 26 for supplying air to the device 15. The duct 31 connects the boiler 11 with the dust collector 23, the flue 32 supplies waste gases from the boiler 11 to the absorber 12, the flue 33 conducts the gases released from the absorber 12 to the chimney 17 through the heater 24, the conduit 44 supplies cooling sea water from the condenser 13 to the absorber 12, the conduit 45 will discharge the sea water from the device 15 for oxidation and decarbonization to a drain or exhaust conduit 70, and the conduits 42, 43 and 44 connect the absorber 12, the device 15, the deaerator 18 and the final flash chamber 19 in the manner shown in the drawing. Fresh sea water from the conduit 46 flows through the heat dissipation section and is exhausted by a conduit 47 to the drain 70.

In operation, the waste gases exhausted from the boiler 11, or any other industrial device having sulfur oxide waste gases, are conducted to the absorber 12 through the dust collection 23 and the flue 32. Fresh sea water that has traveled through the condenser 13 is conducted to the absorber through the conduit 41. The sea water is sprayed downwardly from the upper portion of the absorber 12 and the exhaust gases flow upwardly from a lower portion of the absorber 12, so that the sea water will absorb the exhaust gas sulfur oxides, such as sulfuric anhydride gases. This sea water that has been contacted with waste gases and thus has absorbed sulfur oxides is conducted to the device 15 for oxidation and decarbonization by means of the pump 14 and conduit 42. The sulfites that were produced by the reaction of the sulfuric anhydride ions and the metallic ions such as calcium are oxidized and become stable sulfates within the device 15 and the sea water within the region of an acidity connects with the air from the blower 26 to be decarbonized, whereby the PH thereof is returned to the region of alkalinity. While the device 15 has been shown as being one container, the present invention also contemplates that many containers may be employed. In the container, the sea water is sprayed from a spraying device 53 in the upper portion of the device 15, while the air from the blower 26 is conducted from a lower aperture 54. It is thus seen that within the device 15, the sea water and air travel in opposite directions within the container 52 for oxidation and decarbonization to be accomplished advantageously.

The thus oxidized and decarbonized sea water containing sulfates is conducted from the device 15 in correspondence with the capacity of the evaporator as supplementary water, and any excess sea water is released through the conduit 45 to the drain 70. The supplementary sea water is conducted to the final flash chamber 19 of the evaporator through the deaerator 18, which will remove dissolved oxygen.

The multistage flash evaporator comprises the heat recovery section 20, the heat dissipation section 21 and the brine heater 22. Each section provides a plurality of flash chambers 66, 61 and the condensing chambers 67, 61. Steam which has been flashed in the flash chambers 66, 61 is condensed within the condensing chambers 67, 62 and fresh water is withdrawn from the condensing chambers through a conduit 68 for usage elsewhere.

The heat dissipation section 21 will maintain constant temperature difference for condensing the steam flashed in the flash chamber, and sea water from the conduit 46 is conducted to the condensing chambers 62 and thereafter released through the conduit 70.

In an evaporator of one flow through type, only one kind of sea water may be used and fresh sea water is not necessary. Sea water used for desulfurization is conducted to the final flash chamber 19 after an adjustment of the carbonic acid density and PH of the sea water in the device 15 and the deaerator 18.

With respect to a particular setup, the industrial device 11 may be a boiler for providing high pressure steam to a steam turbine 25, with the exhaust low pressure steam from the turnbine being condensed at 13 and returned as makeup water to the boiler 11. Further, steam may be bled from an intermediate stage of the turbine and fed to the brine heater 22 by the conduit 51 as a source of heat, and thereafter returned to the condenser 13. Other industrial devices, other than the boiler and turbine may of course be employed as a source of waste gases with sulfur oxides. Details of the distillation apparatus have not been given, since most any type of distillation apparatus may be employed, particularly of the heat type, although the multistage flash evaporator shown in the drawing has proved to be quite advantageous.

While a preferred embodiment of the present invention has been shown for purposes of illustration and for the importance of its details, further embodiments, variations and modifications are contemplated within the spirit and scope of the present invention as determined by the following claims.

What is claimed is:

1. A method for the removal of sulfur oxides from the exhaust gases of an industrial source of exhaust gases containing sulfur oxides and for the pretreatment of sea water to be distilled in a heated distillation apparatus for the prevention of scale depositing, comprising the steps of: providing exhaust gases containing sulfur oxide as sulfuric anhydride gases from an industrial source; providing seawater that naturally has alkaline metallic ion; contacting the exhaust gases containing sulfur oxides with the alkaline sea water to absorb the sulfuric anhydride gases of the waste gases into the sea water, in proportions such that the quantity of sulfuric anhydride gases absorbed in the sea water to produce sulfuric anhydride ions dissolved in the sea water does not exceed the equivalence of all the alkaline ions in the sea water and further such that the quantity of sulfuric anhydride gases absorbed in the sea water will substantially completely react with the metallic ions in the sea water to produce metallic sulfites; contacting the sea water having sulfites therein, as produced by the preceeding step, with an oxygen containing gas sufficiently for the metallic sulfites to be transformed to stable metallic sulfates through the catalytic action of the metallic ions in the sea water; decarbonizing the sea water by the carbonic acid ions in the sea water reacting with the hydrogen ions produced by the absorption of the sulfuric anhydride gases to produce water and carbon dioxide that is removed from the solution; and controlling all of the preceding steps so that the thus treated sea water is in the region of alkalinity with stable metallic sulfates and without any substantial amount of sulfuric acid and without any substantial increase in the temperature of the sea water as caused by said steps.

2. The method of claim 1, wherein all of the industrial source exhaust gas is treated with the sea water to remove substantially all of its sulfur oxides, and thereafter directly discharging the exhaust gases into the atmosphere; and thereafter including the step of feeding the sea water substantially within the alkaline range with stable sulfates to a distillation apparatus according to the capacity of the distillation apparatus and automatically releasing any excess treated sea water to the environment.

3. The method of claim 2, further including the step of heating the sea water prior to said step of contacting the exhaust gases with the sea water; and wherein said step of feeding feeds sea water substantially within the alkaline range and having stable sulfates to a multistage flash evaporator having a heat recovery section, a heat dissipation section and a final flash chamber, passes fresh sea water through heat exchange tubes of the heat dissipation section as cooling water, and thereafter discharges the cooling water from the heat dissipation section to the environment.

4. The method of claim 3, further including the step of deaerating the sea water substantially within the alkaline range and with stable sulfates for removing dissolved air and oxygen from the sea water prior to said step of heating.

5. The method of claim 2, further including the step of deaerating the sea water substantially within the alkaline range and with stable sulfates for removing dissolved air and oxygen from the sea water.

6. The method of claim 1, further including the step of deaerating the sea water substantially within the alkaline range and with stable sulfates for removing dissolved air and oxygen from the sea water.

7. The method of claim 1, including the step of heating the sea water prior to said step of contacting the exhaust gases with the sea water.

8. The method of claim 7, further including the steps of thereafter feeding the sea water substantially within the alkaline range and with stable sulfates to a multistage flash evaporator having a heat recovery section, a heat dissipation section, and a final flash chamber; and passing fresh sea water and thereafter discharging the cooling water from the heat dissipation section to the environment.

9. The method of claim 1, wherein said step of contacting the sea water with an oxygen containing gas and said step of decarbonizing the sea water are conducted in one common vessel simultaneously by spraying the sea water with absorbed sulfur oxides downwardly from an upper portion of the vessel and forcing air upwardly from a lower portion of the vessel through the downwardly sprayed sea water and in direct contact with the downwardly sprayed sea water.

* * * * *

UNITED STATES PATENT AND TRADEMARK OFFICE
CERTIFICATE OF CORRECTION

PATENT NO. : 4,152,218
DATED : May 1, 1979
INVENTOR(S) : Tsuneo Narita et al.

It is certified that error appears in the above-identified patent and that said Letters Patent are hereby corrected as shown below:

On The Title Page assignee, should read

-- Hitachi, Ltd., and Babcock Hitachi K.K., Tokyo, Japan --.

Signed and Sealed this

Twenty-fourth Day of July 1979

[SEAL]

Attest:

Attesting Officer

LUTRELLE F. PARKER
Acting Commissioner of Patents and Trademarks